Aug. 29, 1967

C. A. TOLSON 3,337,992

REMOTELY CONTROLLED CLOSURES

Filed Dec. 3, 1965

INVENTOR.
Clyde A. Tolson

Aug. 29, 1967 C. A. TOLSON 3,337,992
REMOTELY CONTROLLED CLOSURES
Filed Dec. 3, 1965 6 Sheets-Sheet 2
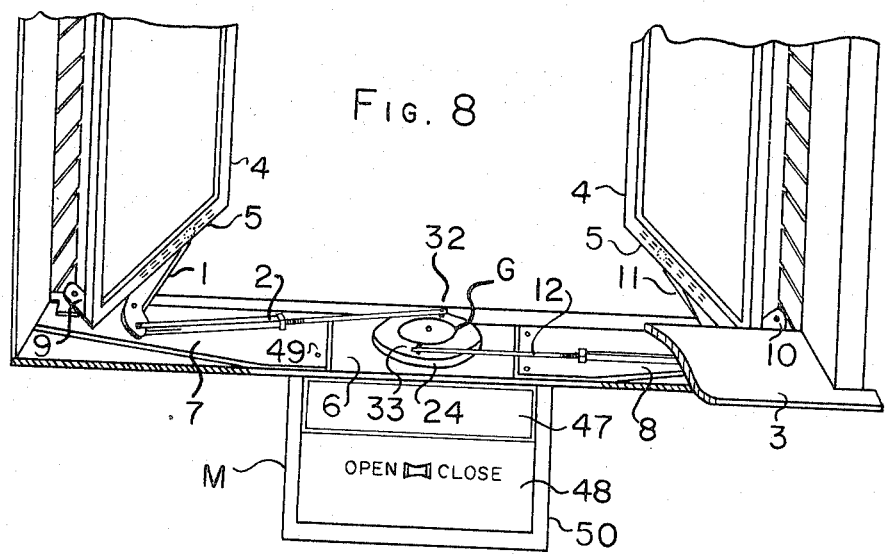
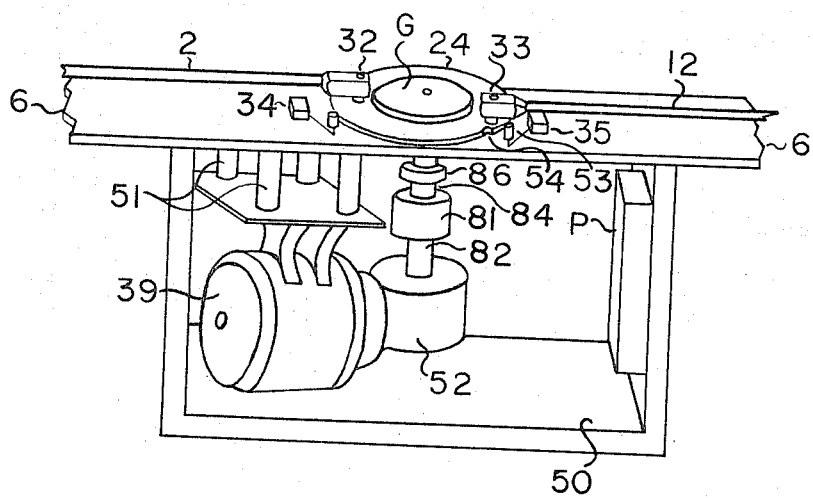
INVENTOR.
Clyde A. Tolson INVENTOR.
Clyde A. Tolson

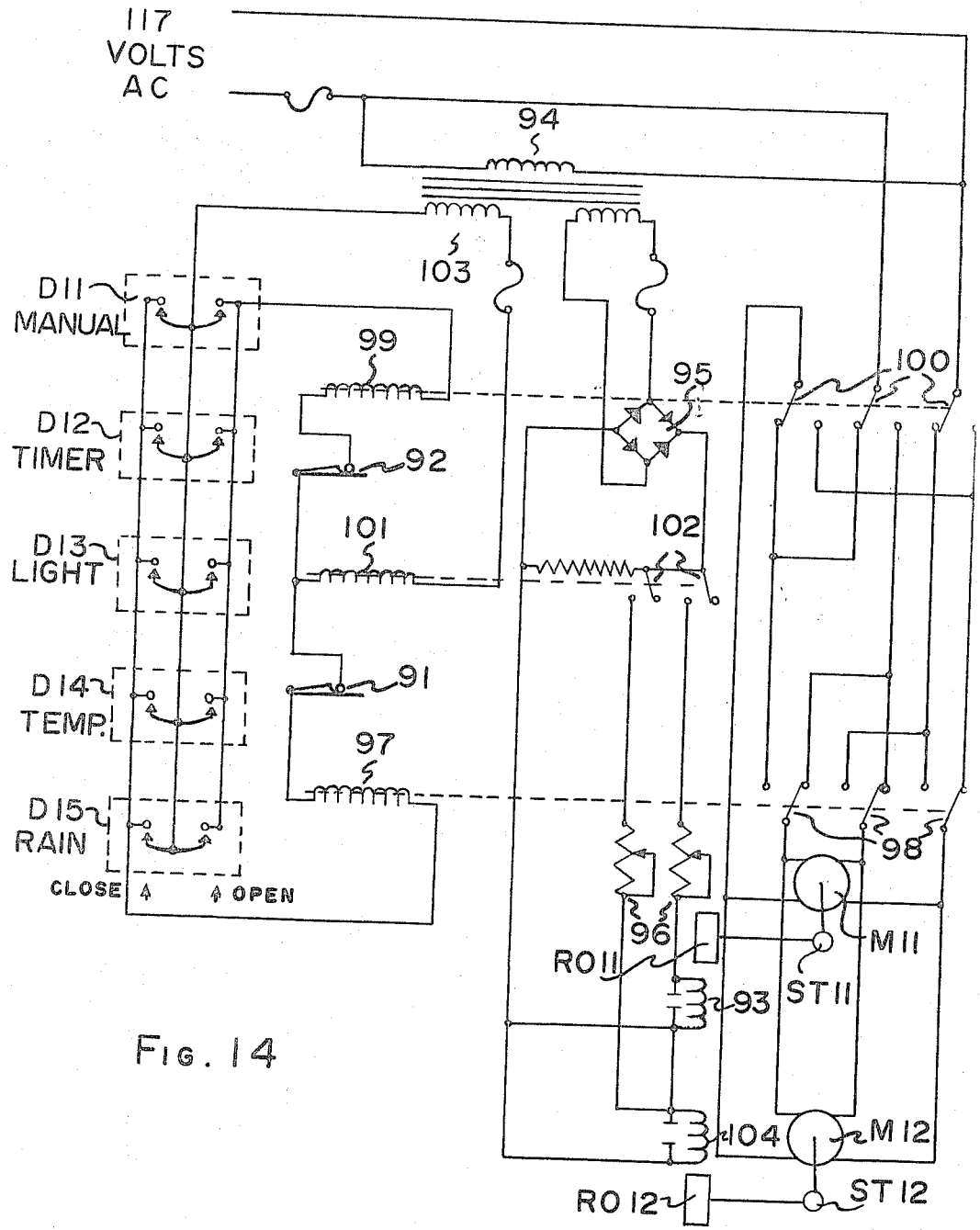

United States Patent Office 3,337,992
Patented Aug. 29, 1967

3,337,992
REMOTELY CONTROLLED CLOSURES
Clyde A. Tolson, 4000 Massachusetts Ave. NW.,
Apt. 1316, Washington, D.C. 20016
Filed Dec. 3, 1965, Ser. No. 511,408
11 Claims. (Cl. 49—29)

The present application is a continuation-in-part of my application Ser. No. 191,862 filed May 2, 1962, for Remotely Controlled Closures now Patent No. 3,235,247.

The present invention relates to remotely controlled closures, such as windows, doors, and the like, and has for its principal object the provision of such closures which may be operated from one or more remotely located sensing devices, each of which, in turn, separately or in combination may operate one or more of the closures in response to any of various selected predetermined conditions. For example, in winter it may be desired to open and close a bedroom window by manual push buttons from a remote control position located at bedside, thus permitting operation of the window after retiring in the evening and before arising in the morning. Alternatively, it may be desired to have a window opened, closed, or adjusted automatically by a time sensing control, set to operate the window at a predetermined time before awakening time, thus permitting the bedroom to be brought to a comfortable temperature prior to arising; or, it may be desired to have a window or door operate automatically upon the response of one or more suitable sensing detectors to the onset of rain, wind, temperature change or any other selected comfort condition which might logically require operation of windows or doors.

It is a further object of the invention to provide programming means, including programming clock means, and priority-determining means to coordinate and control the over-all operation of such closures and the remotely located sensing devices.

Essentially, my present invention is a continuation of the improvements disclosed in my copending application Ser. No. 191,862 supra and comprises further improvements which I have made in important features of the closure system disclosed in said copending application Ser. No. 191,862. The continuation of improvements relates both to mechanical features permitting application to a greater variety of closures, and to electrical control features, as for example, improved programming control means and improved condition-readout means. The claims in the instant application set forth these improved control features and specify the changes in physical and mechanical structure which are involved.

With the foregoing general objects in view, the invention consists in the novel combinations and arrangements of features as will be hereinafter more fully described, illustrated in the accompanying drawings, and defined in the appended claims.

In the accompanying drawings wherein are illustrated different practical embodiments of the invention and wherein like characters of reference denote corresponding parts in related views:

FIGURE 8 is a partially perspective view of one embodiment of the invention suitable for application to conventional casement-type windows.

FIGURE 9 is a partially perspective view of a motor actuating mechanism suitable for use in the arrangement of FIGURE 8.

FIGURE 14 is a simplified diagram of a representative set of interconnections for FIGURE 12.

Figure 1:
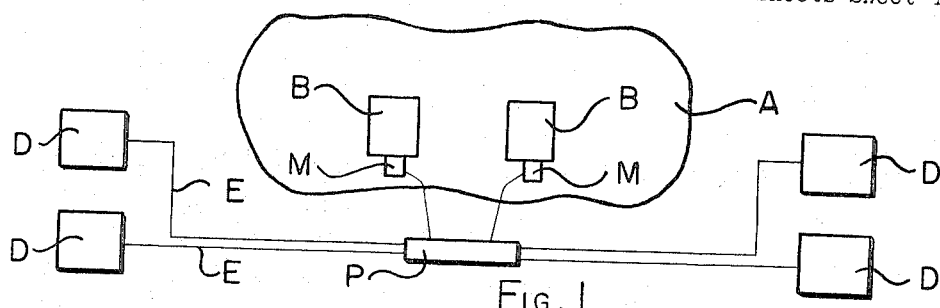
FIGURE 1 is a diagrammatic view illustrating the general over-all principle of the invention.

Referring to the drawings in detail, and specifically to FIGURE 1, A represents generally a portion of a wall or other enclosure, containing one or more closures B (such as windows), each of which may be opened or closed by respective associated reversible motor devices M. Motor devices M, in turn, are controlled by remote sensing devices D over suitable energy paths E, under the over-all control of programming means P.

Figure 2:
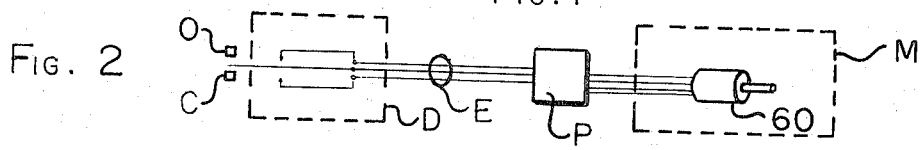
FIGURE 2 is a diagrammatic view illustrating a manual push button sensing remote control, together with a motor actuating unit suitable for use in the arrangement shown in FIGURE 1.

Referring now to FIGURE 2, there is shown at D a remote control sensor consisting of a single pole, three-position normally open switch, responsive to manual operation of push buttons O and C (for opening and closing, respectively). This remote control is suitable for use in the arrangement shown in FIGURE 1. Energy path E consists of three wire conductors leading to the programmer P which in turn actuates the motor device M consisting in this instance of a reversible motor 60. Actuation of push button O causes motor M to turn in a direction opening its associated closure B (of FIGURE 1), whereas actuation of push button C serves to operate the motor in the reverse direction.

Figure 3:
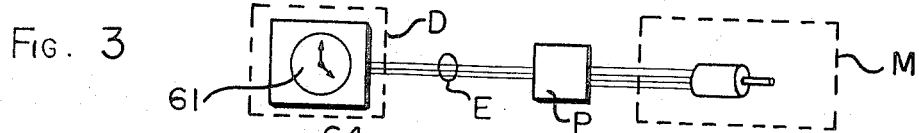
FIGURE 3 is a diagrammatic view illustrating a time control sensing device, together with actuating motor suitable for use in the arrangement of FIGURE 1.

Referring now to FIGURE 3, there are shown an alternative remote control sensing device D and motor device M suitable for use in the embodiment of FIGURE 1. Sensing device D in this instance consists of a clock 61, connected to programmer P by a three-conductor wire energy path E. Clock 61 may be set to actuate motor device M at any desired predetermined time, or sequence of times, subject to the control of programmer P.

Figure 4:
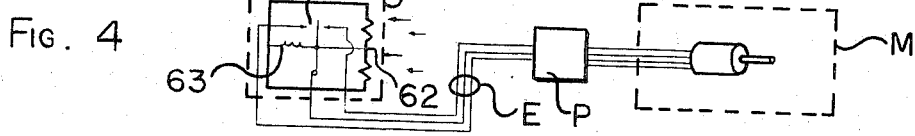
FIGURE 4 is a diagrammatic view illustrating a pressure responsive sensing device, together with actuating motor suitable for use in the arrangement of FIGURE 1.

In FIGURE 4, there is shown at D an atmosphere pressure sensing device and related motor device M suitable for use in the embodiment of FIGURE 1. Sensor D in this instance consists of a pressure sensitive area 62 operating against spring loader 63 to open or close electrical contacts 64 upon change of air pressure to predetermined values. Closing of contacts 64 thus actuates motor device M through programmer P to operate its related closure B (of FIGURE 1).

Figure 5:
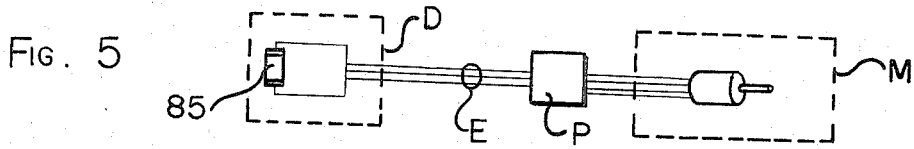
FIGURE 5 is a diagrammatic view illustrating a temperature sensitive remote control device, together with an actuating motor suitable for use in the arrangement of FIGURE 1.

Referring now to FIGURE 5, there is shown at D still a different type of sensing device, together with associated motor device M suitable for use in the arrangement of FIGURE 1. Sensor D in this instance includes an adjustable element 85 whose resistance value changes with temperature change; thus, when sensing element D is subjected to predetermined temperature limits, the related motor device M is thereupon caused to operate the related closure B (of FIGURE 1), subject to over-all control of programmer P.

Figure 6:
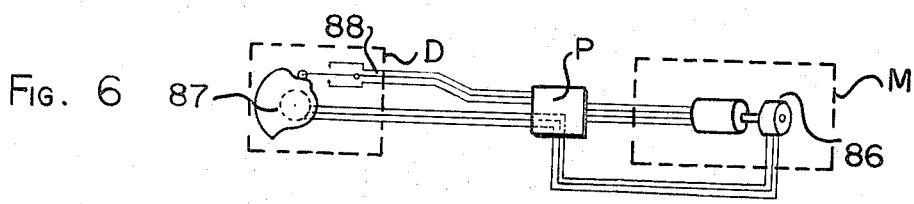
FIGURE 6 is a diagrammatic view illustrating a servo type remote control unit for adjusting the closures to any desired intermediate positions, together with actuating motor suitable for use in the arrangement of FIGURE 1.

Referring now to FIGURE 6, there is shown at D still a different type of sensing device together with associated motor device M suitable for use in the arrangement of FIGURE 1. Sensor D in this instance consists of an adjustable servo driven cam 87 coupled to an enclosure position signal generator 86. Situated rotatably around the periphery of cam 87 and actuated by said cam is a three position single pole switch 88. With the cam 87 and switch 88 in the relative positions shown, this sensor is in the quiescent or neutral condition; however, if switch 88 is moved either clockwise or counterclockwise relative to cam 87, a corresponding pair of contacts of switch 88 will be closed, causing motor device M to drive generator 86 and servo coupled cam 87 in a corresponding respective direction until servo coupled cam 87 again achieves its original, shown position relative to switch 88. Thus any closure coupled to motor device M will be driven to any predetermined position, corresponding to the selected peripheral setting of switch 88, ranging from fully closed to fully open. It will also be apparent that the position of the cam serves as a read-out indicator to indicate the condition or degree of closing of the closure to which it is coupled; further, the read-out indicator function is not dependent upon presence of switch 88, and therefore may be used in conjunction with other types of sensors, or may be used alone without association with a sensor.

Figure 7:
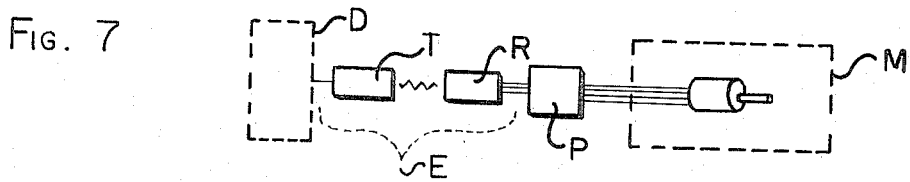
FIGURE 7 is a diagrammatic view illustrating the use of suitable energy transducers between the remote sensing device and the actuating motor.

While wire paths are shown in FIGURES 2 through 6, it will be apparent to those skilled in the art that energy paths E may equally well be of any other suitable nature, such as an ultrasonic sound beam, a radio signal, a light beam, and the like, provided that suitable transmitter transducer T and receiver transducer R are inserted in the energy path as shown in FIGURE 7. Transducers T and R, of course, are selected to transmit and receive the desired type of energy for a portion of the energy path between D and M.

Although the invention is applicable to any desired type of closure, there is shown in detail in FIGURES 8 through 11 one practical embodiment of the invention as applied to conventional casement-type windows.

Referring now in detail to FIGURE 8, there are shown at 4 casement window sashes in partially opened position, and window sill 3 partially cut away. Windows of the casement type are normally opened and closed manually by bell crank and lever assemblies through which motion is imparted separately to each window sash 4 by lever movement in a raceway 5 provided at the bottom of each window sash. The present invention includes the substitution, in lieu of the normal manual means, of a window actuating motor mechanism M whose bell crank levers 1 and 11 may operate in existing window raceways 5 and to which levers power is supplied through connecting links 2 and 12 attached to driving cam assembly G. This window actuating mechanism is assembled on a base plate 6, to which base-plate extensions 7 and 8 are attached by connectors 49, readily adapting the mechanism to a variety of window sizes. Levers 1 and 11 and sash hinges 9 and 10 are mounted on base-plate extensions 7 and 8. Adjustable connecting links 2 and 12 provide power coupling from cranks 32 and 33 of driving cam 24 to levers 1 and 11, so that upon rotation of cam 24 in one direction windows 4 are opened and upon rotation of cam 24 in the opposite direction windows 4 are closed. Appropriate driving means for cam assembly G are located within compartment case 50, and covered by hinged panel 47 and fixed panel 48.

Referring now to FIGURE 9, there is shown in detail the driving means for cam assembly G. To the bottom side of base plate 6 is attached motor 39 by means of stand-off spacers 51. Drive shaft 82 is connected to motor 39 through reduction gear box 52. At 81 is shown a variable friction clutch linking drive shaft 82 with cam shaft 84. While clutch 81 may be of any desired type, a preferred type is the so-called magnetic clutch, the function of which is to transmit from shaft 82 to shaft 84 a torque which may be controlled and varied from zero torque, through intermediate values, up to the maximum torque exerted by shaft 82. A suitable representative clutch which may be employed for this purpose, for example, is the product of Stearns Electric Corporation, Milwaukee, Wis. identified as their electromagnetic disc clutch size 3.5, style SMR. In normal operation the driving torque of clutch 81 is adjusted to a value sufficiently large to open and close the windows 4 under normal conditions, and yet sufficiently low to be non-destructive of the driven mechanism in the event of jamming.

With the torque of clutch 81 adjusted to zero torque, the windows are capable of being opened and closed by hand, since they are now free of the locking effect which would otherwise be provided by the high reduction gear ratio of the gears in gear box 52 connecting motor 39 to drive shaft 82. However, with the torque adjusted to a driving value, driving cam 24 is then operated by motor 39 through shaft 82, clutch 81, and cam shaft 84, to operate the windows. P designates the programmer.

At 86 coupled to cam G is shown a position signal generator, the function of which is to furnish a position output signal which is uniquely characteristic of the angular position of cam 24 and, therefore, similarly characteristic of the corresponding position of the related closures 4. This output signal in turn may be used through appropriate servo mechanisms to provide predetermined intermediate positions of the closures 4 in accordance with programmed instructions under the control of the programmer P, using the arrangement of FIGURE 6, for example.

It will be further noted that operating off driving cam 24 there are located an opening microswitch 34 and a closing microswitch 35 which interconnect the mechanical and related electrical systems in order to limit the opening and closing movement of the cam 24 and, therefore, of the windows which the cam drives. Closing microswitch 35 is adjustable for positioning at a point where driving cam 24 will permit release of the closing microswitch 35 when cam 24 reaches a position corresponding to a fully closed position of the related window sashes. Release of the microswitch 35 is accomplished when roller 53 falls into notch 54 of the cam. By release of the microswitch is meant causing the microswitch to form an open circuit. Opening microswitch 34 is similarly adjustable to position it for desired maximum opening of the window sashes at which point driving cam 24 will permit release of the opening microswitch 34 in the manner similar to that described above for microswitch 35.

Figure 10:
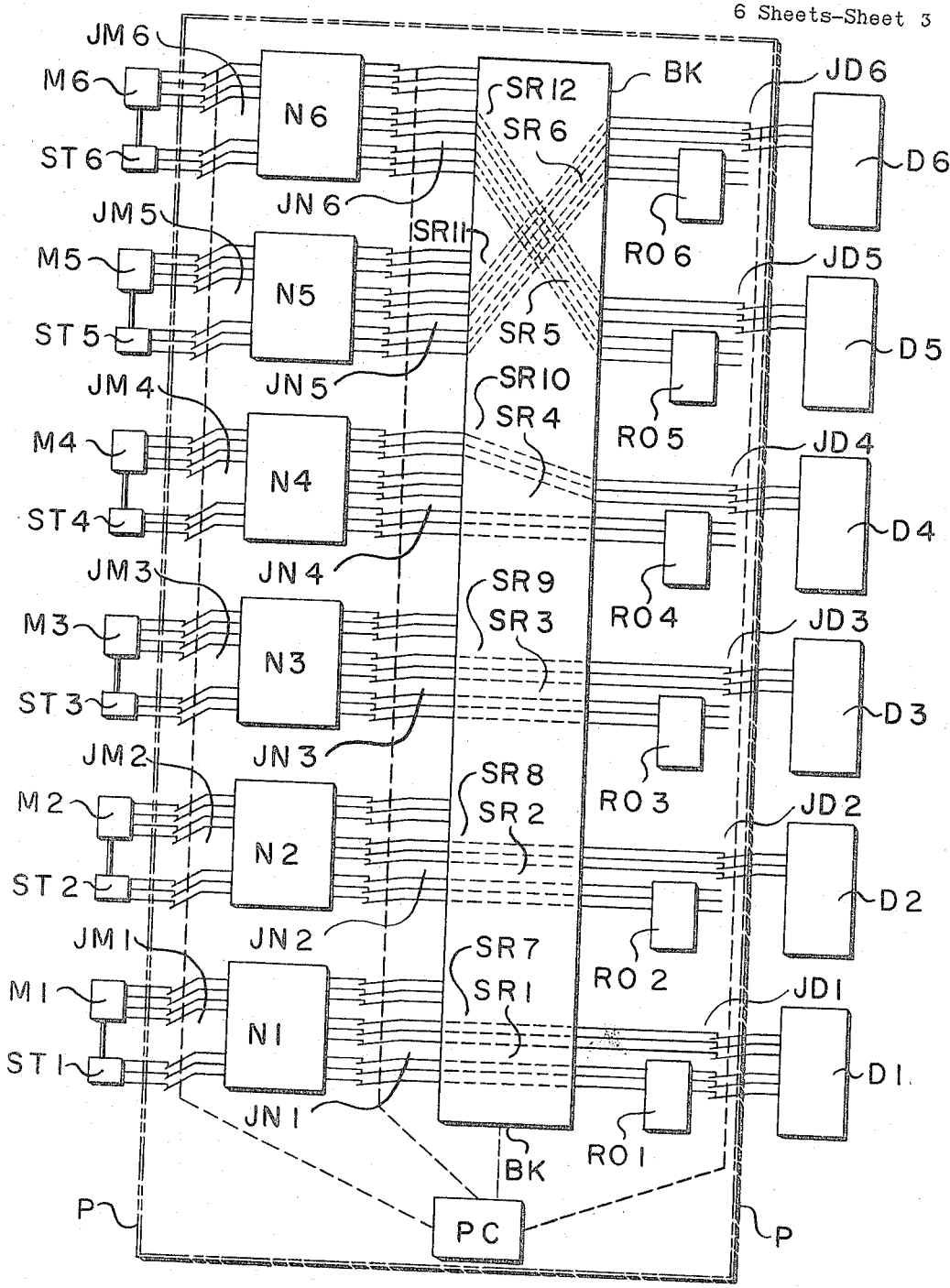
FIGURE 10 is a diagrammatic representation of a programmer consisting of a programming clock and associated switches and readout devices, showing representative interconnections with remote sensors and closure control motors, suitable for use in the arrangement of FIGURE 1.

Referring now to FIGURE 10, there is shown diagrammatically at P a simple programmer suitable for use with the mechanical and electrical system shown in FIGURES 1 through 6, 8 and 9. D1 through D6 represents a series of remote sensing devices, each connected to programmer P by a 6 pole switch, respectively shown as JD1 through JD6. D1 is a sensor of the type shown in FIGURE 6; the remainder D2 through D6 do not involve servo connections, and may be of types represented by FIGURES 2 through 5. These switches, JD1 through JD6, may be manually operated, as for example by means of 6-pin plug and jack connections, or they may be relays electrically or mechanically controlled by a programming clock shown as PC, this control being diagrammatically indicated by dotted line from PC to JD1 through JD6. Some of the remote sensors, for example, those using a servo loop, may make use of all 6 conductors, as shown for D1; others may require a smaller number, such as the 3 conductors shown, for example, at D2 through D6. For each servo type sensor, the 3 conductors used for the servo loop may also lead through and actuate a readout device as shown at RO1. In the case of sensors not using servo feedback, the 3 programmer conductors otherwise used for this purpose merely drive a corresponding readout device as shown at RO2 through RO6. At BK is shown diagrammatically a bank of 12 rotary, 12 position, 9 circuit stepping relays, shown as SR1 through SR12, so connected that any one or any combination of switches JD1 through JD6 can be stepped into connection with any one or any combination of an additional series of six 9 pole switches shown as JN1 through JN6. Typical such interconnections are shown by dotted lines connecting JD1 to JN1; JD2 to JN2; et cetera. Switches JN1 through JN6 likewise may consist of 9-pin plug and jack arrangements for manual interconnection; or alternatively may be electrically or mechanically controlled relays operating under the control of programming clock PC as illustrated by dotted line connecting clock PC to JN1 through JN6. Similarly stepping relays SR1 through SR12 may be manually actuated, or alternatively may be electrically or mechanically controlled by programming clock PC, as represented by dotted line joining clock PC to BK. At N1 through N6 are shown power control modules connected respectively between switches JN1 through JN6 and a third set of switches shown as JM1 through JM6. Switches JM1 through JM6 each consist of a 7 pole switch, which can be identical and, which may take the form of a 7-pin plug and jack for manual interconnection, or alternatively may consist of a 7 pole relay, mechanically or electrically controlled by programming clock PC as represented by dotted connection between switches JM1 through JM6 and clock PC. At M1 through M6 are shown closure motor devices, each driven by a corresponding power module N1 through N6. At ST1 through ST6 are shown servo transmitters, each coupled to a corresponding motor device M1 through M6, and electrically connected through internal programmer connections as shown to a corresponding readout device RO1 through RO6.

It will be seen that by means of this programmer, any combination of closure driving motor devices M1 through M6 can be connected to one or any combination of remote sensor devices D1 through D6, and that this connection may be varied by manual operation of the interconnecting switches, or alternatively the manner and order of interconnection can be varied under the control of programming clock PC. Similarly, the condition of any closure driven by a motor device such as M2, will through the action of servo transmitter ST2 be reflected in one of the servo controlled readout devices RO1 through RO6.

Figure 11:
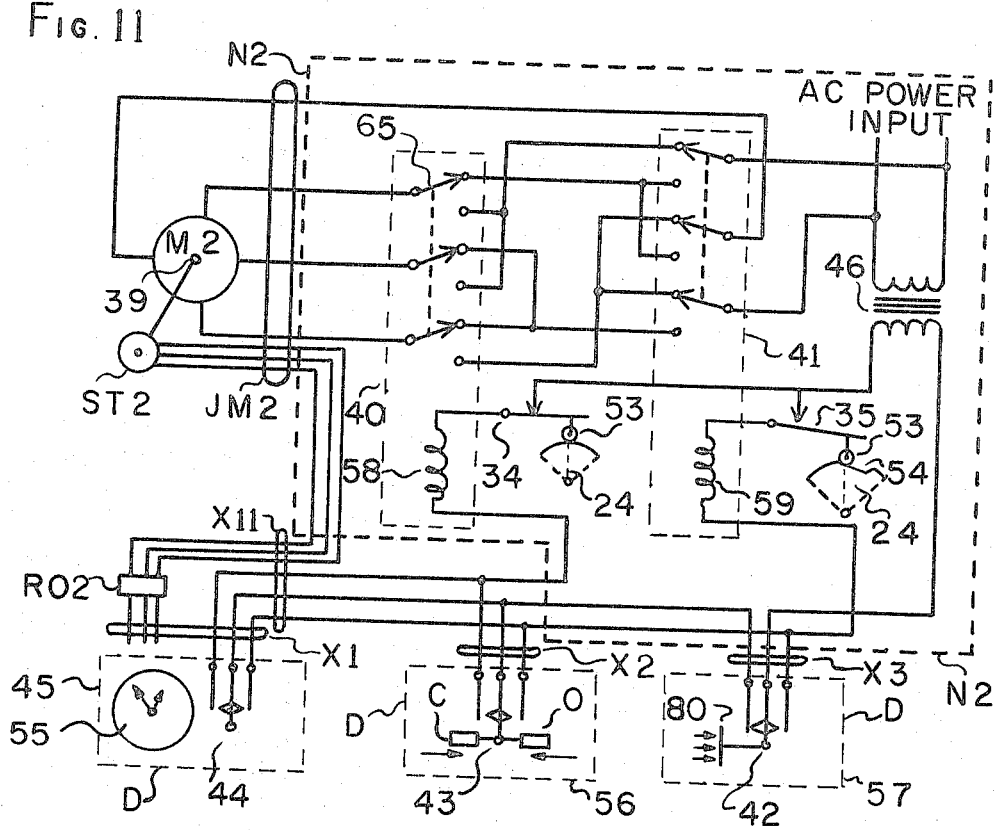
FIGURE 11 is a simplified diagram of representative detailed interconnections of certain components of FIGURE 10.

Referring now to FIGURE 11, which is primarily a schematic diagram of a typical power module N2, and of a simplified representative set of connections through typical circuits of FIGURE 10, there is shown at 45 a remote control sensing device consisting of a three-position normally open switch 44 which in this instance is under the control of an associated time clock 55. At 56 is shown another remote control sensing device consisting of a three-position normally open switch 43, which in this instance is responsive to operation of associated push buttons O (open) and C (close). At 57 is shown still another remote control sensor consisting of a two-position single pole double throw switch 42 having one side normally closed and the other side normally open. Switch 42 in this instance is responsive to an associated air pressure element 80 to open the normally closed circuit and to close the normally open circuit when the air pressure on element 80 exceeds a predetermined value. In the interest of simplicity there is represented by X1 in FIGURE 11 the connection of switch JD2 of FIGURE 10 and by X11 in FIGURE 11 the connections through stepping relay bank BK and switch JN2 of FIGURE 10. Similarly, there is shown at X2 in FIGURE 11 alternate simplified connections through switch JN2, stepping bank BK, and switch JD3 of FIGURE 10; and at X3 there is shown such simplified connections through switch JN2, bank BK, and switch JD4. It will be apparent to those skilled in the art by reference to FIGURE 10 that additional remote control sensing devices, either of the type shown or types consisting of elements responsive to other conditions, such as rain, temperature and the like, can be added in the same manner as devices 45, 56, and 57. At 46 is shown a low-voltage transformer, the output of which is connected to relay winding 58 of opening relay 40 through remote sensing devices 45, 56 and 57, and through microswitch 34. Similarly, transformer 46 is connected to winding 59 of closing relay 41 through remote sensing devices 45, 56 and 57, and through the closing microswitch 35. At 39 is indicated a reversible electric motor (the physical location of which is shown in FIGURE 9). Relays 40 and 41 are shown in the normal position with coils 58 and 59 unenergized; microswitches 34 and 35 are shown in positions corresponding to a fully closed position of the window sashes.

Thus, upon movement of any one of the remote control sensing switches to the "open" position, as for example operation of switch 43 by push button O, coil 58 will be energized and the relay contacts 65 of the relay 40 will swing to the energized position, whereupon reversible motor 39 will be so connected as to turn in a direction to drive cam assembly G (of FIGURES 8 and 9) in the clockwise direction, thus opening the windows and simultaneously operating microswitch 35. Upon release of push button O, the windows will remain at the position reached at the time of push button release, until such time as the motor is again activated by one of the remote sensing devices, or until the windows are moved manually as described earlier. For example, the windows may remain in the open position until the operation of the time clock switch 44 energizes the winding 59 of the closing relay, whereupon motor 39 would be energized to turn in the opposite direction and thereby close the windows.

It will be noted that in the interconnections shown in FIGURE 11, remote sensors 45 and 56 have equal priority of control, whereas remote sensor 57 exercises priority over both 45 and 56; that is, if the wind pressure is such that switch 42 is thrown to the activated position, then switches 43 and 44 are thereby rendered inoperative for such time as the pressure on element 80 is sufficient to keep switch 42 in the activated position. The practical effect of this is that if the windows should be open and a wind storm arises, the windows will be automatically closed in spite of any attempts by the time clock sensor 45 or the push button sensor 56 to open the windows. In the absence of such a wind storm the windows would be opened and closed as desired by push button sensor 56, or operated automatically on a predetermined time schedule by time sensor 45. It will also be observed by reference to FIGURE 10 and 11 that certain sensors D are each connected to programmer P by the same number of conductors (in the present instance, by 3 conductors). Hence, these sensors can be readily interchanged with each other merely by interchanging their respective 3-conductor connections with the programmer P, thereby simultaneously changing the relative priority of control exercised by any given sensor D to that priority corresponding to the programmer circuit to which the sensor is connected. It will be apparent to those skilled in the art that this interchange of connections can be readily accomplished in a variety of ways, such as by the use of similar 6-conductor plug and jack fittings between sensors D and programmer P in the manner of the well known plug-board. The interchange similarly can equally readily be accomplished through the use of manually or electrically operated switches, such as the rotary stepping switches SR1 through SR6.

By way of illustration, since it has already been explained above and illustrated in connection with sensors 45, 56, and 57 of FIGURE 11 how one or more sensors may be given equal priority of control or alternatively, may be given greater or lesser priority of control than another sensor, it will be apparent that by specifically interchanging the electrical connections to sensors 56 and 57 of FIGURE 11, priority of control would be similarly interchanged and sensor 56 would assume priority of control over sensor 57. Since it is equally apparent that these electrical connections can be readily interchanged by electrically operated relays or switches, and such relays can be actuated by a time clock or other timing device as explained above, it is readily feasible in this manner to time control the time interval and sequence of desired priority among the plurality of sensors D. Suitable clocks for this purpose, known in the trade as programming clocks, are available from a number of manufacturers, as for example, Edwards Company, Inc., Norwalk, Conn., Zenith Electric Company, Chicago, Ill., and Montgomery Manufacturing Company, Inc., Owensville, Ind., the Model A4 of the last-named company being a representative suitable programming clock for use in the present invention.

In a similar manner any other desired control parameters such as selection of specific closures to be governed by certain sensors may be programmed.

It will be further observed that establishment of priority of control may also be secured by rendering any selected sensor or group of sensors inoperative by opening the circuit between the selector sensor and its terminal motor device. For example, by opening JD3, JN3, or JM3 under the control of clock PC, sensor D3 is relegated to lowest priority for duration of such open circuit.

While a relatively simple programmer has been shown and described in order to illustrate one embodiment of the invention, the invention is not at all restricted to such simple programmers and much more sophisticated programmers may equally well be used and will be preferable in systems where a larger complex of windows may be involved or where it is desired to have the windows controlled by a larger number or greater variety of remote control sensing devices. The invention contemplates that such programmers may, for example, include more complex priority-determining elements, such as additional programming clocks and electronic delay circuits to determine the period during which selected remote sensing devices may exercise priority; and may include a more complex memory element such as a magnetic core memory to receive and store operating instructions; and further may include a computer element to combine the signals sent by the various remote control devices and use the result of this combined signal to select the course of action to be taken by all windows under the control of the device. It is also contemplated that the programmer may include more complex and more numerous "read-out" elements which will indicate at one or more desired locations the relative status of the various windows which are so controlled; i.e., which windows are shut, which open, and the degree to which opened. Various indicator systems suitable for this application are well known in the art, particularly in the field of telemetering devices, and may range from the simple electrical circuit and associated meter needle such as is used in the familiar automotive gasoline gauge, to complex servo systems in which the indicator display is controlled through servo loops from the closures, sensors, et cetera. (See FIGURE 6.) A thorough discussion of such servo systems may be found in volume 25 of the Massachusetts Institute of Technology Radiaton Laboratory Series, Theory of Servo-Mechanisms, published by McGraw-Hill Book Company, Inc., 1947.

Moreover, as pointed out earlier, the present invention is not restricted to any one type of closure. For example, referring now to FIGURE 12, there is shown at B a sliding sash type of window 66 in which the movable sash 73 is driven by activating motor means M consisting of reversible motor 67, magnetic clutch 89, and position signal generator 90, operating in conjunction with worm and gear units 68 and 69, sprocket 70, drive chain 71, and idler pulley 72. At 91 and 92, coupled to sprocket 70 are shown a closing limit switch and an opening limit switch, respectively, which functions to limit the travel of sash 73 in a manner similar to that explained earlier in connection with FIGURE 9. Motor 67 and the related driving train are, in turn, controlled by programmer 74 which includes a priority-determining unit 75, a computer unit 77, a computer subsystem memory unit 76, and a "read-out" unit 78. A plurality of remote control sensing devices are shown at D, each of which may be of any desired type, as described earlier. The priority-determining unit 75 includes necessary relays, programming clocks, and other electronic circuitry such as delay circuits to establish and allocate desired priority of control among the plurality of remote sensing devices D, as described above in connection with the embodiment of FIGURE 8 through 11. The memory unit 76 may consist of any of the well known methods of receiving and storing information but prefered types are the magnetic disc type and the magnetic core type.

In chapter 4 of the book entitled Magnetic Recording Techniques, published by McGraw-Hill Book Company (1958 Edition) the author, W. Earl Stewart points out that the magnetic disc has long been used for storing information and forms the basis for one form of random access memory. Pages 107 through 114 of the same book describe in some detail the operation of the disc. Page 114 of the same book also describes another well known memory system using a magnetic drum as a storage medium. On page 399 of Van Nostrand's Scientific Encyclopedia, published by D. Van Nostrand Company, Inc., Third Edition, there is illustrated and described still another form of magnetic memory using small magnetic cores, and many other types of information storage systems, magnetic and otherwise, are known in the art. Van Nostrand's International Dictionary of Physics and Electronics, Second Edition, on page 1094 points out, for example that the physical means of storing information may be electrostatic, ferroelectric, magnetic, acoustic, optical, chemical, electronic, electrical, mechanical, and other in nature.

The computer unit 77 is preferably of transistor or other solid state type, but any of the well known computer systems in the art may be used to receive and correlate the responses of the various remote sensing devices with the instructions set up in the memory unit, in order to furnish appropriate control signals to the closure driving means M. A representative suitable computer and memory for this purpose capable of handling a complex of closures is the type 301 system with associated peripheral accessory equipment manufactured by Radio Corporation of America, Camden, N.J. Read-out unit 78 preferably comprises for each controlled closure an indicator which shows the degree of opening or closing of its respective closure, together with indicators showing the status of each remote sensing unit, and certain key information stored in the memory; however, more or less read-out information may be displayed if desired. Representative suitable indicators for this purpose are available from a variety of commercial suppliers, as for example, the Model 1HG selsyn generator and Model 1S selsyn receiver as manufactured by Ford Instrument Company, Long Island City, N.Y.

In chapter I of the book The Logic of Computer Arithmetic, published by Prentice-Hall, Inc., 1963, the author, Ivan Flores, sets out in some detail computer systems and subsystem structure, and points out that the various subsystems may be present in multiple and variety (page 4) and that the circuits involved fall into several categories (page 5). Thus, it is well known that many computer configurations are possible, depending upon the complexity of the input data, the processing operations desired, et cetera. For this reason, it is *customary in the art*, as illustrated by Figure 1.1.1 on page 2 of the above book by Flores, to show assembly of systems from smaller units by means of block diagrams, without specifying in detail the myriad of actual interconnections possible, and in the interest of simplicity, this procedure has been employed in illustrating the programming means 74 of FIGURE 12.

Figure 12:
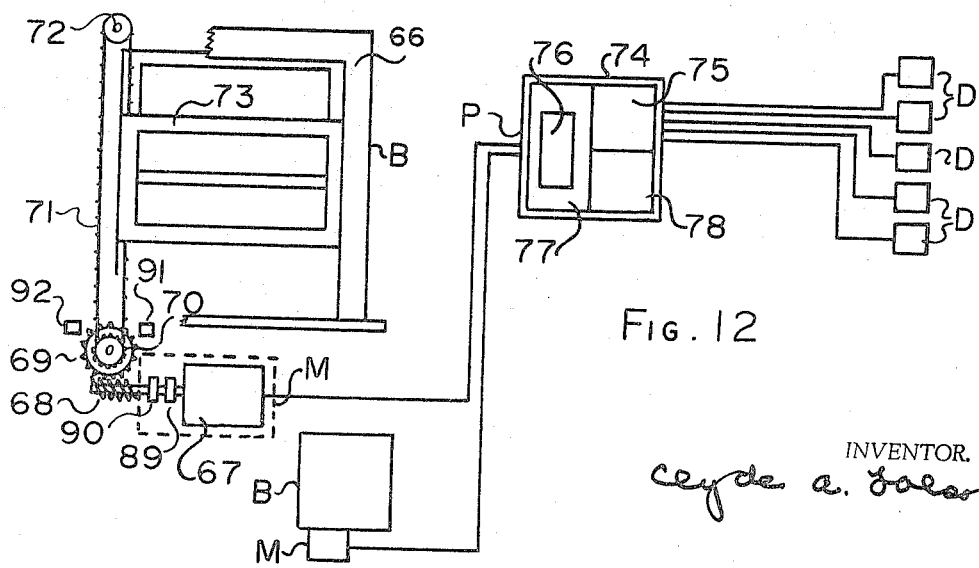
FIGURE 12 illustrates another practical embodiment of the invention suitable for application to sliding sash type of closures and also illustrates a more sophisticated type of programmer.
Figure 13:
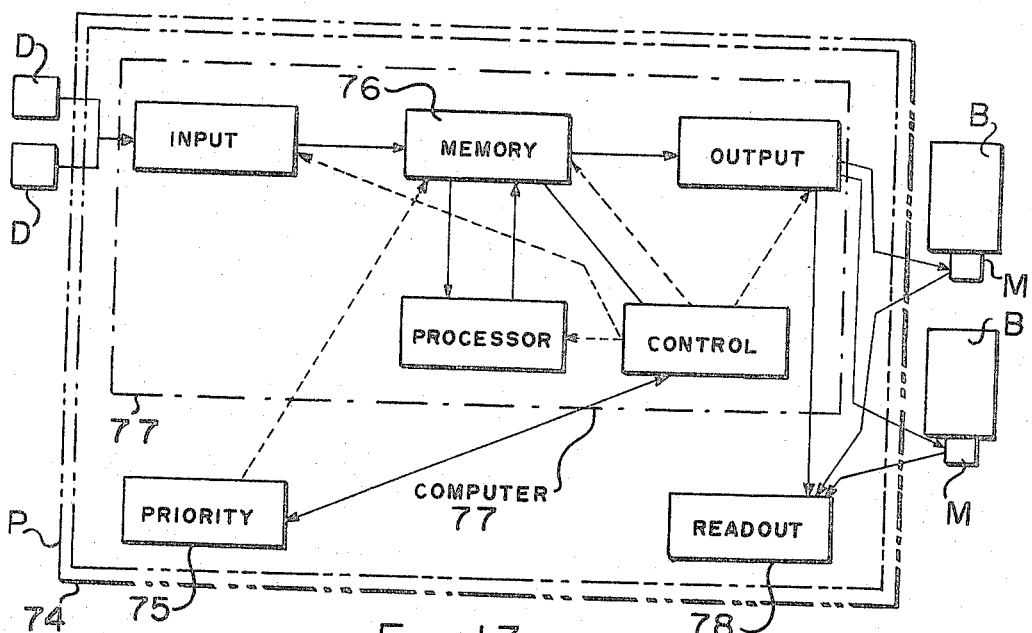
FIGURE 13 shows diagrammatic detail of the programmer of FIGURE 12.

However, there is also shown in FIGURE 13 a further breakdown of these functional units within programmer P, illustrating a typical, representative set of relationships between the subsystems involved, using conventional diagrammatic representation, as shown, for example, in Figure 1.1.2 on page 3 of "The Logic of Computer Arithmetic," supra. In FIGURE 13, as in FIGURE 12, P again represents the overall programming means interconnected between a plurality of sensors D and a plurality of enclosures B driven by respective motor means M. P in this instance consists of programmer 74 which in turn includes a priority-determining subsystem 75, a computer system 77, and a read-out subsystem 78. Memory subsystem 76 is in this instance shown as a subsystem of computer 77.

Referring now to FIGURE 14, there is shown a representative highly simplified schematic diagram of a typical set of power and control interconnections between a plurality of sensors D and a plurality of closure-driving motors M, such as might be established by the arrangement of FIGURE 12. D11 is a manually operated sensor; D12 is a timer-operated sensor; D13 is a light-operated sensor; D14 is a temperature-operated sensor; and D15 is a rain-operated sensor. Under the interconnections shown, D11 through D15 have equal priority of control and are energized by low voltage secondary 103 of transformer 94, through magnetic clutch relay winding 101. The "close" contacts of D11 through D15 are energized through close-limit switch 91 and close-relay winding 97 and the "open" contacts of D11 through D15 similarly are energized through open-limit switch 92 and open-relay winding 99 as shown.

At M11 and M12 are shown two closure driving motors operating under the control of open-relay contacts 100 and close-relay contacts 98. Contacts 98 and 100 are shown in the normal unactivated position, and will be thrown to the opposite, activated position by current through coils 97 and 99 respectively. Coupled to Motor M11 is a position signal generator ST11 which in turn drives read-out indicator RO11. Similarly motor M12 drives generator ST12 and corresponding read-out indicator RO12. Another secondary of transformer 94 is connected to a rectifier 95, producing a direct current supply which is fed to magnetic clutch windings 93 and 104 through clutch relay contacts 102 and adjustable resistors 96.

Thus, for example, when "close" contacts of manual sensor D11 are closed by manual operation, clutch relay winding 101 and close-relay winding 97 are energized, in turn activating clutch relay contacts 102 and close-relay contacts 98. Clutch windings 93 and 104 are thereby energized, connecting motors M11 and M12 to their respective closures, with a torque transfer which is dependent upon the selected values of variable resistors 96. Activation of close-relay contacts 98 establishes power to motors M11 and M12 in the proper sense to cause their respective closures to move to the closed position. A similar result is achieved whenever the "close" contacts of any other sensor D12 through D15 are closed, by selected time, selected light level, selected temperature level, or condition of rain, respectively. In the same manner, closing of the "open" position contacts on any one of the sensors will energize magnetic clutch relay winding 101 and the open-relay winding 99; in turn magnetic clutch windings 93 and 104 will be energized and open-relay contacts 100 will be moved to activated position, which will furnish power to motors M11 and M12 in the proper sense to open their respective associated closures.

The simplified connections shown in FIGURE 14 serve merely to illustrate one possible simple configuration of interconnections between sensors D and motors M. By reference to FIGURES 13 and 14 it will be seen that many other possible interconnections can be established, to incorporate desired preselected conditions of control, priority, and operation of a complex of sensors and closures.

It is further pointed out that this invention has application to a wide variety of structures. For example, as applied to an aircraft, a plurality of sensors can be located at strategic points both within and on the exterior of the plane, for the purpose of automatically opening a plurality of emergency windows or other exits under certain selected predetermined emergency conditions as detected by the remote sensors. For example, on occasion, following an emergency aircraft landing, there may be a number of potential survivors of the initial landing, who, however, then may find themselves fatally trapped by an ensuing fire. In such a case, the present invention would make it possible to have selected windows or other emergency exits open automatically throughout the airplane or if so programmed, only in those areas of the airplane where the windows were not totally blocked by fire, for the purpose of providing the maximum, safest possible egress from the plane. Sensors of importance in this application would include among others, temperature (fire), wind velocity (to prevent opening exits while in flight), static air pressure within and outside aircraft (to prevent opening while cabin pressurized or while still air-borne), and of course manually controlled sensors.

Figure 15:
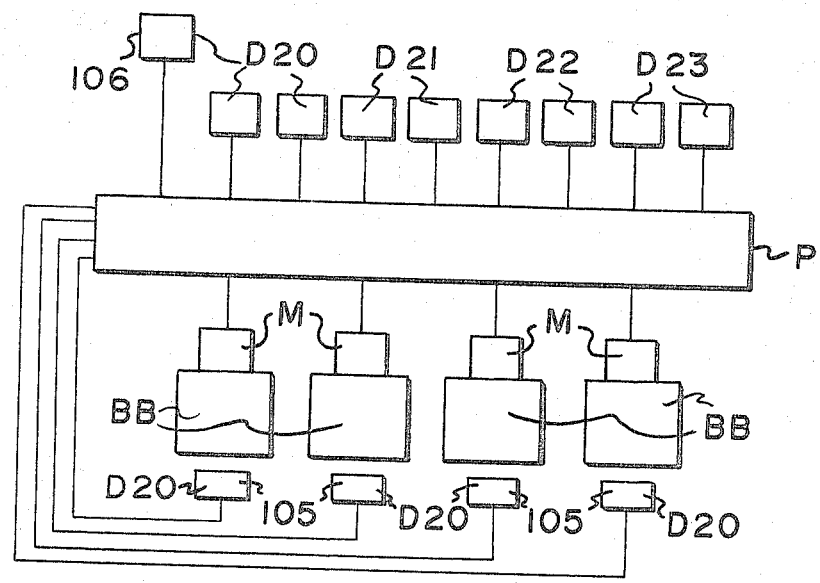
FIGURE 15 illustrates a system configuration suitable for use in aircraft emergency conditions.

Referring now to FIGURE 15, there is illustrated a typical system configuration suitable for such aircraft application. In this figure, D20 represents high temperature sensors (fire); D21 represents air pressure (wind velocity) sensors; D22 represents static air pressure sensors (relative pressure within and outside of cabin, altitude, etc.); and D23 represents manual control sensors to permit possible multiple group exit control by aircraft officials, or to permit individual manual control by passengers. The sensor shown and described in connection with FIGURE 2 is suitable for use as D23; sensors of the general type shown and described in connection with FIGURE 4 are suitable for use as D21 and D22; and that shown and described in connection with FIGURE 5 is suitable for use as D20. A plurality of emergency exits is designated by BB. Data from the remote sensors D20 through D23 is fed to programmer P as described above for other embodiments such as that of FIGURE 11. The data is "processed" by the programmer to determine which, if any, emergency exits BB are clear, and then to open such exits automatically through the action of respective associated motor means M.

For example, it has already been explained in connection with FIGURE 11, how different sensors may be given priority of control over other sensors. In the case of the system shown in FIGURE 15, a selected high temperature sensor D20 further designated as 105 is located in the immediate vicinity of each given closure BB. This selected sensor may be given priority over all other commands relating to its respective closure in the manner described above. Thus if this selected sensor 105 detects a high temperature in the vicinity of its respective closure sufficiently high as to render exit impossible, this selected sensor 105 can block any otherwise effective command from the programmer to open the respective closure. On the other hand, if a potential command to open a selected closure is received by the programmer resulting, for example, from a high temperature sensor D20, further designated as 106, located on the wing of the aircraft, and a selected sensor 105 in the immediate vicinity of said closure detects no temperature sufficiently high as to render exit impossible, the command is "cleared" and placed into execution, and the respective closure is opened automatically. In a similar manner, air speed sensors D21 and altitude sensors D22 may be given priority to block opening of all emergency exits while the aircraft is still airborne, but permitting such opening at ground level and sufficiently low speeds. By making the opening of multiple emergency exits automatic under emergency conditions and under programmed circumstances (and therefore independent of possibly panic stricken passengers) the present invention thus makes possible a great improvement over previously existing emergency exit systems.

While only certain specific embodiments of the invention have been illustrated and described to convey the general concept of the invention, it is to be understood that the same is readily capable of various other embodiments within its spirit and scope as defined in the appended claims.

What I claim as new and desire to secure by Letters Patent of the United States is as follows:

1. A remotely controlled closure system comprising at least one movable closure, motor means for moving said closure to selected open and closed positions, linkage means connecting said motor to said closure, a plurality of remote sensing elements responsive to selected control conditions, and programming means connected between said motor means and said sensing elements for controlling the opening and closing movement of said closure in accordance with responses from said sensing elements and further in accordance with preselected instructions and programmed control parameters; and in which system certain of said motor means are also coupled to at least one closure-position signal generator, and in which certain of said sensing elements include at least one adjustable closure-position selector, said signal generator and said adjustable selector being interconnected through said programming means by a servo loop for controlling movement of said motor means and related closure in the direction and to the extent selected by said adjustable selector.

2. A remotely controlled closure system as set forth in claim 1 in which said programming means includes priority determining means for regulating priority of control among said sensing elements; computer means for receiving, storing, and processing control data and instructions; and read-out means for indicating the condition of the system including the relative position of said movable closure.

3. A remotely controlled closure system as set forth in claim 5 in which said movable closure is part of an aircraft structure, and in which certain of said sensing elements are responsive to selected aircraft environment conditions, and further in which said preselected instructions and programmed control parameters include automatically opening said closure under selected conditions of emergency closure-environment which are consistent with reasonably safe human egress from said opened closure.

4. A remotely controlled closure system as set forth in claim 3 in which certain of said sensing elements are responsive to high temperatures at selected positions on the aircraft including positions in the immediate vicinity of said closure, and in which certain other of said sensing elements are responsive to air speed to the aircraft and still others are responsive to altitude of the aircraft, and further in which said selected conditions of closure environment include humanly survivable limits of temperature, air speed, and altitude.

5. A remotely controlled closure system comprising at least one movable closure, motor means for moving said closure to selected open and closed positions, linkage means connecting said motor to said closure, a plurality of remote sensing elements responsive to selected control conditions, and programming means connected between said motor means and said sensing elements for controlling the opening and closing movement of said closure in accordance with responses from said sensing elements and further in accordance with preselected instructions and programmed control parameters; and in which system said linkage means includes an electrically adjustable friction clutch for electrically controlling to selected values the closure-moving force transmitted by said linkage, said values including substantially zero closure-moving force and also including closure-moving force sufficient to move said closure under normal conditions but insufficient to be destructive of said closure under abnormal conditions.

6. A remotely controlled closure system as set forth in claim 5 in which at least one of said remote sensing elements is responsive to time control.

7. A remotely controlled closure system as set forth in claim 5 in which at least one of said remote sensing elements is responsive to selected weather conditions.

8. A remotely controlled closure system as set forth in claim 5 in which at least one of said movable closures is a conventional window, and in which said motor means comprises electrical motor means, and further in which certain of said sensing elements are responsive to time control and other of said sensing elements are responsive to manually operated switches and still other of said sensing elements are responsive to selected weather conditions, whereby said window is moved at selected times and in accordance with said weather conditions and said manually operated switches and further in accordance with said preselected instructions and programmed control parameters under supervisory control of said programming means.

9. A remotely controlled closure system as set forth in claim 5 in which said programming means includes priority determining means for regulating priority of control among said sensing elements; computer means for receiving, storing, and processing control data and instructions; and read-out means for indicating the condition of the system including the relative position of said movable closure.

10. A remotely controlled closure system as set forth in claim 5 in which said movable closure comprises a hinged-type closure; and in which said motor means includes at least one electric motor mounted on a base plate provided with laterally extending adjustable base-plate-extension arms, said hinged-type closure being movably pivoted on said arms; and in which said linkage includes a plurality of limit switches connected between said motor and said closure for limiting the travel of said motor to selected positions corresponding to preselected positions of said closure.

11. A remotely controlled closure system as set forth in claim 5 in which said movable closure comprises at least one sliding sash closure; and in which said linkage includes a rotatable driven sprocket, and a drive chain connected to said sliding sash closure and engaging the teeth of said sprocket, whereby rotation of said sprocket in one direction causes said sash to open and rotation of said sprocket in the opposite direction causes said sash to close; and in which said linkage further includes a plurality of limit switches connected between said motor means and said sash for limiting the travel of said motor means to selected positions corresponding to preselected positions of said sash.

References Cited

UNITED STATES PATENTS

| | | | |
|---|---|---|---|
| 2,198,488 | 4/1940 | Smith | 160—5 |
| 2,499,544 | 3/1950 | Vancil | 49—2 |
| 2,527,565 | 10/1950 | Miller | 318—162 X |
| 3,012,156 | 12/1961 | Simmons | 318—162 X |
| 3,198,937 | 8/1965 | Wooster | 318—162 X |
| 3,235,247 | 2/1966 | Tolson | 49—29 X |

DAVID J. WILLIAMOWSKY, *Primary Examiner.*

HARRISON R. MOSELEY, *Examiner.*

J. K. BELL, *Assistant Examiner.*